AMPLITUDE MODULATION LIMITING CIRCUIT
Filed March 7, 1956
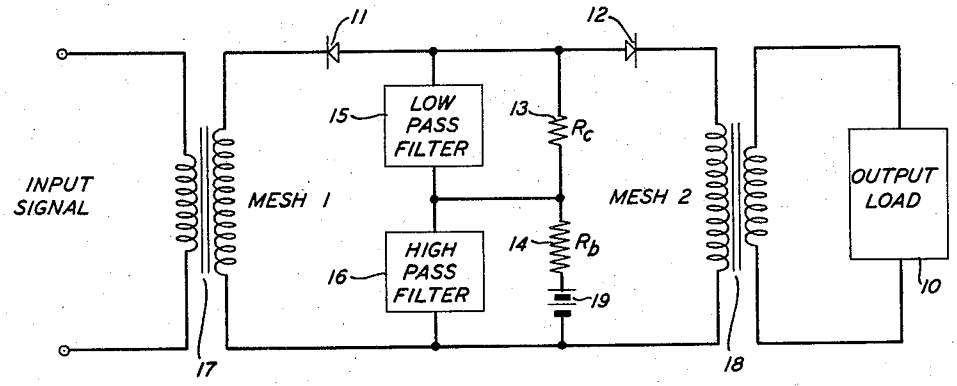
INVENTOR
C. L. RUTHROFF
BY Roy M. Porter, Jr.
ATTORNEY United States Patent Office
2,848,609
Patented Aug. 19, 1958

2,848,609

AMPLITUDE MODULATION LIMITING CIRCUIT

Clyde L. Ruthroff, Fair Haven, N. J., assignor to Bell Telephone Laboratories, Incorporated, New York, N. Y., a corporation of New York Application March 7, 1956, Serial No. 570,010
13 Claims. (Cl. 250—27)

This invention relates to frequency modulation transmission systems and more particularly to circuits used in such systems for limiting the amplitude modulated components fortuitously impressed upon the frequency modulated signal.

In a frequency modulation transmission system, any amplitude modulation present in the signal constitutes undesirable noise. A theoretically ideal limiter circuit incorporated in such a system would completely eliminate all amplitude modulation in the signal. In the past, this objective has only been partially realized. That is, limiter circuits have been developed which reduce the amplitude of each carrier cycle to a constant value, thereby reducing the amplitude modulation. This, however, does not mean that amplitude modulation has been totally eliminated from the signal. Fourier analysis of such a "clipped" envelope indicates the presence of amplitude modulation within the envelope.

This phenomenon is readily understandable. For example, consider that portion of a half cycle of the F.-M. carrier signal sloping from the abscissa to the positive boundary of the "clipped" envelope. An A.-M. noise signal impressed at this point may produce a concave or convex irregularity in the curve depending upon whether the noise signal is in its positive or negative excursion at that point. This irregularity may occur anywhere along the sloping curve depending upon the nature of the A.-M. noise signal, i. e., anywhere between the abscissa and the boundary of the "clipped" envelope. Therefore, although further reduction of the amplitude of each carrier cycle will reduce the amplitude modulation to a still lower level, theoretically perfect limiting cannot be achieved by this process without infinite loss, corresponding to zero output from the limiter.

The consequences of the failure to eliminate all amplitude modulation components are felt in the discriminator stage which usually follows the limiter circuit in F.-M. systems. The output of a discriminator stage is just as readily distorted by A.-M. components within the "clipped" carrier envelope as it would be if A.-M. components existed external thereto.

It is a primary object of the invention, therefore, to provide limiting action which eliminates all A.-M. components present in an F.-M. carrier signal.

It is an additional object of the invention to provide an improved limiting action in a limiter circuit wherein the amplitude of the F.-M. carrier signal is not appreciably attenuated.

In accordance with the present invention the amplitude modulated, or noise, signal is made totally self-destructive by balancing a portion of it against itself. A portion of the A.-M. signal may be isolated and directed in phase opposition to the remaining portion of the A.-M. signal. By properly proportioning the amplitudes of the two components, in accordance with the invention, the A.-M. signal completely balances itself out. This is achieved in a limiting circuit in the following way. From the A.-M. modulated side-bands a portion of the A.-M.

signal is demodulated to a baseband frequency and is caused to pass through a pure resistance which partially determines the amplitude of the demodulated or baseband A.-M. signal. The remaining undisturbed portion of the side-bands is caused to pass through a second pure resistance of a different value than the first. This second resistance partially determines the amplitude of the undisturbed side-bands. By an appropriate arrangement of high and low-pass filters, the undisturbed side-bands are not affected by the first resistance, while the baseband signal is unaffected by the second resistance. The demodulated baseband signal is then reimpressed upon the carrier so that a new remodulated side-band is created in phase opposition to the undisturbed side-band passing through the second resistance. By appropriately selecting the values of the two resistors in accordance with the invention, the amplitudes of the remodulated and undisturbed side-bands may be made equal. Since these side-bands are in phase opposition they will effectively cancel each other and all amplitude modulation is thereby eliminated.

These and other objects and features of the present invention, the nature of the invention and its advantages, will appear more fully upon consideration of the illustrative embodiment shown in the accompanying drawing and the following detailed description.

The drawing is a combined electrical schematic and block diagram representation of a limiter circuit presented as an example, in accordance with the invention, purely for the purpose of illustration. The limiter circuit comprises two meshes. The first mesh is excited by an input signal; the second mesh excites an output load 10. The input signal exciting mesh 1 comprises a frequency modulated carrier signal upon which has been impressed an amplitude modulated noise signal. For the purposes of this discussion, and for reasons hereinafter to be explained, the input signal may appropriately be considered a carrier plus two side-bands caused by the amplitude modulated noise signal. Output load 10 may be, for example, a second limiter stage, a discriminator, or an amplifier depending upon the requirements of the particular system in which the limiter is used. Each of the meshes contains a non-linear impedance, which may, for example, be vacuum tube diodes or semiconductor diodes 11 and 12 as depicted in the drawing. Diodes 11 and 12 are disposed so that their like electrodes are connected, i. e., the easy direction of conductivity of the diodes are in series opposition. The two meshes have a common branch disposed between diodes 11 and 12 and comprising two resistors 13 and 14. The magnitudes of resistors 13 and 14 fulfill an important function in the operation of the limiter, and will hereinafter be discussed at greater length. Resistors 13 and 14 are disposed in a series relationship. Shunting resistor 13 is a low-pass filter 15, which may be simply an inductive coil while a high-pass filter 16, which may be simply a capacitor, shunts resistor 14. As a consequence, high frequency energy, such as the carrier and its side-bands, will pass through resistor 13 but will not pass through resistor 14 which is shunted by the high-pass filter. Baseband signals (signals having a frequency equal to the difference between the carrier and its side-bands) on the other hand, will pass through resistor 14 but not through resistor 13 by virtue of the low-pass filter shunting resistor 13. It may be seen therefore that meshes 1 and 2 are coupled at baseband frequencies by virtue of the mutual resistor 14 while at carrier and side-band frequencies the meshes are coupled by virtue of the mutual resistor 13. A means for biasing diodes 11 and 12 is included in this branch in series with resistors 13 and 14. In the drawing this takes the form of battery 19. It may be noted that high-pass filter 16 is not only in a shunt relationship with resistor 14 but also with battery 19. Therefore, carrier energy need not pass through battery 19 and, as a consequence, the attenuation inherent in this process is avoided. The input signal is suitably coupled to mesh 1 through transformer 17 while output load 10 is coupled to mesh 2 by transformer 18. Direct or resistance-capacitive coupling may alternatively be employed if preferred.

Consider now the operation of the embodiment of the invention depicted in the drawing. With the application of an input signal the carrier and the side-band currents in mesh 1 will flow through diode 11 and resistor 13. In mesh 2 they will flow through diode 12 and the same resistor 13. It may be noted that the carrier and side-band currents of mesh 2 excite the output load through transformer 18. It will be clear to those skilled in the art that the amplitudes of the side-band currents of mesh 2 are partially determined by the value of resistor 13. As the amplitude level of the input signal is increased above the biasing level afforded diodes 11 and 12 by battery 19, the diodes begin to switch to their back resistances for respectively different portions of the signal cycle. When this occurs the A.-M. noise signal is effectively demodulated across diodes 11 and 12. As a result, a baseband current, whose frequency is equal to the difference between the frequencies of the side-bands and the carrier, flows through resistor 14, but not through resistor 13 because of the low-pass filter shunting resistor 13. It is apparent, therefore, that the amplitude of the baseband current is partially determined by the value of resistor 14. The voltage drop across resistor 14 due to the baseband current flowing therethrough, may be considered a new or secondary input signal applied to diodes 11 and 12. This signal actually constitutes a portion of the energy of the A.-M. noise signal which previously was carried by the side-bands. This secondary input signal then beats with the carrier across diodes 11 and 12 producing a new pair of remodulated side-bands. Because diodes 11 and 12 are poled in series opposition as previously described, the remodulated side-bands in mesh 2 are in phase opposition to the undisturbed portions of the side-bands flowing in the same mesh.

As previously indicated, the amplitudes of the remodulated side-bands and the undisturbed side-bands depend partially upon resistors 14 and 13, respectively. The values of resistors 14 and 13, are chosen, in a manner hereinafter to be described, so that the amplitudes of the remodulated and undisturbed side-bands are equal. With equal amplitudes and an opposing phase relationship in the remodulated and undisturbed side-bands, the net side-band current in mesh 2, and therefore in output load 10, is zero. Since these side-bands are the vehicles for the A.-M. noise signal, the noise signal is completely eliminated and only the frequency modulated carrier excites the output load. This corresponds to perfect A.-M. limiting.

An expression for the side-band currents flowing in mesh 2 may be obtained by mesh analysis of the limiter circuit. This expression contains two parameters, $R_c$ and $R_b$, independent of each other, which represent the values of resistors 13 and 14, respectively. Since perfect limiting occurs when the side-bands in mesh 2 are eliminated, it may be seen that the limiting action is a function of the resistor variables, i. e., by selecting values for resistors 13 and 14 the expression representing the side-band currents in mesh 2 may be made equal to zero. Since meshes 1 and 2 each contain non-linear resistive elements by virtue of diodes 11 and 12, respectively, certain assumptions must be made before a mesh analysis is possible. It is known in the art that any non-linear resistance may be represented by a Fourier series, the coefficients of which have the dimensions of resistance. However, this is true only for a low-index modulation system, i. e., only if the carrier is large compared with the amplitude of the A.-M. noise signal impressed on the carrier. It may be pointed out at this time that the side-bands representing the information bearing F.-M. signal, due to their phase relationships relative to the carrier, do not demodulate and remodulate as do the A.-M. side-bands. Therefore, the F.-M. side-bands have no part in this analysis. They pass through the circuit suffering the same loss as the carrier. With this explanation and the restriction that the A.-M. modulation index is low, the limiter circuit can be solved by the usual linear circuit techniques. Specifically, mesh equations are obtained including the Fourier representation of diodes 11 and 12. Then, mesh equations are grouped for each mesh at each frequency, i. e., the carrier, baseband, direct-current, and A.-M. side-band frequencies. The mesh equations for the side-bands in mesh 2 may then be solved. The solution for the side-bands, straightforwardly obtained, is represented by the following equation:

$$S_2=\frac{\frac{k}{2}E\left(R_c[(r_0+R_b)(R_0+R_b)-R_b^2]-\frac{r_1R_1}{2}R_b\right)}{D} \tag{1}$$

In this expression $r_0$ and $R_0$ are the direct-current coefficients of the Fourier series respectively representing diodes 11 and 12; $r_1$ and $R_1$ are the carrier frequency coefficients of the Fourier series representation, respectively, of diodes 11 and 12; $R_b$ and $R_c$ are the parameters representing the values of resistors 14 and 13, respectively; E is the amplitude of the input signal and $k$ is the index of modulation. D, which is the denominator of Equation 1, is an involved expression, the details of which are not necessary for the purpose of this discussion since we are interested in the entire equation being equal to zero. This occurs when the numerator is equal to zero. Although the numerator of Equation 1 is not a simple expression, it does define the relationship of $R_b$ and $R_c$ and consequently the requirements for perfect limiting. More simply, from Equation 1, it is seen that perfect limiting occurs if, and only if, the following equation holds:

$$0=R_c[(r_0+R_b)(R_0+R_b)-R_b^2]-\frac{r_1R_1}{2}R_b \tag{2}$$

Equation 2 may be satisfied by values of $R_b$ and $R_c$ wherein $R_b \neq R_c$ and also wherein $R_b=R_c$. However, certain advantages accrue stemming directly from Equation 2, when the preferred relationship, $R_b \neq R_c$, is used. Thus, if poor and inexpensive diodes are used, that is diodes having a small ratio of back to forward resistance, less loss is involved in the limiter circuit when the preferred relationship is used. In addition, it is well known that the back to forward resistance ratio in diodes tends to decrease with an increase in frequency. Therefore, at high frequency the preferred relationship permits less loss in the circuit while maintaining perfect limiting action.

As indicated above, the efficiency of the limiter circuit is dependent upon the input signal being one having a low index of modulation. In one of several successful reductions to practice, with $R_b \neq R_c$, an input signal having a 20 percent modulation index provided 45 db of amplitude modulation suppression at a one megacycle carrier frequency with only a 7 db loss in the carrier signal. Although it is the case that the efficiency of operation of the limiter is a function of the index of modulation of the input signal, signals having high indices of modulation may also be efficiently and satisfactorily limited in a manner well known in the art. This can be achieved by cascading two or more of the limiters depicted in the drawing; the number of limiting stages employed increasing with the index of modulation and the efficiency desired. From the above discussion the efficiency and versatility of a limiter circuit in accordance with the invention is therefore apparent.

Although a single limiter circuit is disclosed in the drawing, various equivalent and dual circuits thereof may be mechanically developed by employing the standard transformation techniques and equations well known to those skilled in the art. Furthermore, it is to be understood that the above-described arrangement is merely illustrative of the application of the principles of the invention. Numerous other arrangements may be devised by those skilled in the art without departing from the spirit and scope of the invention.

What is claimed is:

1. In a frequency modulation transmission system capable of propagating a frequency modulated carrier signal upon which has been impressed an amplitude modulated noise signal, an amplitude modulation limiter circuit comprising two diodes disposed with their like electrodes connected, means for biasing said diodes, whereby at all signal levels greater than the biasing level afforded the diodes said diodes each demodulate a portion of the A.-M. noise signal from the F.-M. carrier at respectively different halves of the signal cycle, said demodulated portion of the A.-M. signal constituting a new and distinct baseband signal whose frequency is equal to the difference between the carrier frequency and that of the amplitude modulated side-bands, two resistors in a series relationship disposed across said limiter circuit between said two diodes, a low-pass filter shunting the first of said two resistors, a high-pass filter shunting the second of said two resistors, whereby said demodulated baseband signal current flows through said second resistor but not through said first resistor while said carrier signal and side-band currents flow through said first resistor but not through said second resistor, said first resistor having a value of resistance different from that of said second resistor.

2. In a frequency modulation transmission system capable of propagating a frequency modulated carrier signal upon which has been impressed an amplitude modulated noise signal, an amplitude modulation limiter circuit comprising an input circuit, an output circuit including a utilizing means, means in each of said input and output circuits for demodulating a portion of said A.-M. signal to baseband frequencies, means for electrically biasing each of said demodulating means, a first means including a first resistive portion for electrically coupling said input and output circuits at said carrier and its A.-M. side-band frequencies, a second means including a second resistive portion for electrically coupling said input and output circuits at said baseband frequencies, said first resistive portion having a different value of resistance than said second resistive portion.

3. A combination as recited in claim 2, wherein said first coupling means comprises a low-pass filter in parallel to said first resistive portion, said second coupling means comprises a high-pass filter in parallel to said second resistive portion, said first and second resistive portions being in a series relationship one to another, whereby said carrier and A.-M. side-band frequencies pass through said first resistive portion but not through said second resistive portion and said baseband frequencies pass through said second resistive portion but not said first resistive portion.

4. A combination as recited in claim 2, wherein said first coupling means comprises a high-pass filter in series to said first resistive portion, said second coupling means comprises a low-pass filter in series to said second resistive portion, said first and second resistive portion being in a series relationship one to another, whereby said carrier and A.-M. side-band frequencies pass through said first resistive portion but not through said second resistive portion and said baseband frequencies pass through said second resistive portion but not said first resistive portion.

5. An amplitude modulation limiter circuit comprising two non-linear impedances disposed with their like electrodes connected, a first and a second resistor disposed in a series relationship to each other across said limiter circuit between said diodes, means for by-passing said first resistor at low frequencies and means for by-passing said second resistor at high frequencies, said resistors having values satisfying the equation $$0=R_c[(r_0+R_b)(R_0+R_b)-R_b^2]-\frac{r_1R_1}{2}R_b$$

wherein $R_b$ and $R_c$ are the parameters representing the values of the second and first resistors respectively.

6. In a frequency modulation transmission system, an amplitude modulation limiter circuit comprising first and second meshes, means for coupling an input signal to said first mesh, said input signal comprising a frequency modulated carrier signal upon which is impressed an amplitude modulated noise signal, a utilizing means, means for coupling said second mesh to said utilizing means, said first and second meshes each including a non-linear impedance, said non-linear impedances disposed with their like electrodes connected, means for biasing said non-linear impedances included in a branch common to said first and second meshes, first and second resistors also included in said common branch, means for shunting said first resistor at frequencies less than said carrier and its side-bands and means for shunting said second resistor at frequencies in the band of said carrier and its side-bands, whereby said first mesh is coupled to said second mesh by said first resistor at said higher frequencies and by said second resistor at said lower frequencies.

7. In a frequency modulation transmission system, an amplitude modulation limiter comprising input and output circuits, a non-linear impedance located within each of said circuits, said non-linear impedances disposed with their like electrodes connected, means for producing a biasing current in each of said non-linear impedances in their forward direction, said input and output circuits having a common resistive element, a low-pass filter shunting a portion of said common resistive element, and a high-pass filter shunting a different portion of said common resistive element, whereby said common resistive element couples said input and said output circuits at different frequencies.

8. A combination as recited in claim 7, wherein said non-linear impedances comprise semi-conductor diodes.

9. A combination as recited in claim 7 above, wherein said high-pass filter comprises a capacitor and said low-pass filter comprises an inductive coil.

10. In a frequency modulation transmission system, an amplitude modulation limiter comprising an input circuit and an output circuit including a utilizing means, a non-linear impedance located in each of said circuits disposed with their like electrodes connected, means for biasing each of said diodes relative to a common reference point, a resistive element common to said input and output circuits, at least one reactive element defining a long-time constant shunting a first portion of said resistive element, and at least one reactive element defining a short-time constant shunting a second portion of said resistive element.

11. A combination as recited in claim 10, wherein said first portion of said resistive element and said second portion of said resistive element have values satisfying the equation $$0=R_c[(r_0+R_b)(R_0+R_b)-R_b^2]-\frac{r_1R_1}{2}R_b$$

wherein $R_b$ and $R_c$ are parameters representing the values of the second and first resistive portions respectively.

12. In a frequency modulation transmission system capable of propagating a frequency modulated carrier signal upon which has been impressed an amplitude modulated noise signal, an amplitude modulation limiter circuit comprising an input circuit, an output circuit including a utilizing means, means in each of said input and output circuits for demodulating a portion of said A.-M. signal to baseband frequencies, means for electrically biasing each of said demodulating means, a first means including a first resistive portion for electrically coupling said input and output circuits at said carrier and its A.-M. side-band frequencies, a second means including a second resistive portion for electrically coupling said input and output circuits at said baseband frequencies, said first and second resistive portions having values satisfying the equation $$0=R_c[(r_0+R_b)(R_0+R_b)-R_b^2]-\frac{r_1R_1}{2}R_b$$

wherein $R_b$ and $R_c$ are parameters representing the values of said second and first resistive portions respectively.

13. A combination as recited in claim 12 wherein $R_b$ has a value different from that of $R_c$.

References Cited in the file of this patent

UNITED STATES PATENTS

| | | |
|---|---|---|
| 1,313,070 | Cohen | Aug. 12, 1919 |
| 1,628,676 | Meissner | May 17, 1927 |
| 2,281,395 | Travis | Apr. 28, 1942 |
| 2,576,833 | Goodall | Nov. 27, 1951 |